United States Patent
Liu et al.

(10) Patent No.: US 12,252,291 B2
(45) Date of Patent: Mar. 18, 2025

(54) INNER MEMBRANE REMOVING DEVICE AND INNER MEMBRANE REMOVING METHOD THEREOF

(71) Applicant: TRUKING TECHNOLOGY LIMITED, Hunan (CN)

(72) Inventors: Zhi Liu, Hunan (CN); Xufeng Xiao, Hunan (CN)

(73) Assignee: TRUKING TECHNOLOGY LIMITED, Hunan (CN)

( * ) Notice: Subject to any disclaimer, the term of this patent is extended or adjusted under 35 U.S.C. 154(b) by 232 days.

(21) Appl. No.: 17/755,990

(22) PCT Filed: Jan. 10, 2020

(86) PCT No.: PCT/CN2020/071501
§ 371 (c)(1),
(2) Date: Jun. 14, 2022

(87) PCT Pub. No.: WO2021/093157
PCT Pub. Date: May 20, 2021

(65) Prior Publication Data
US 2022/0388703 A1    Dec. 8, 2022

(30) Foreign Application Priority Data
Nov. 15, 2019  (CN) .......................... 201911119239.X

(51) Int. Cl.
*B65B 69/00*    (2006.01)
*B08B 9/08*    (2006.01)
*B65B 55/24*    (2006.01)

(52) U.S. Cl.
CPC ............ *B65B 69/0066* (2013.01); *B08B 9/08* (2013.01); *B65B 55/24* (2013.01); *B65B 69/00* (2013.01); *B08B 2209/08* (2013.01)

(58) Field of Classification Search
CPC ............................ B65B 69/0066; B65B 69/00
(Continued)

(56) References Cited

U.S. PATENT DOCUMENTS 4,123,890 A * 11/1978 Russell .................... B43M 7/02
                                                           83/912
5,463,841 A    11/1995 Hayakawa et al.
(Continued)

FOREIGN PATENT DOCUMENTS

CN    105107821 A    12/2015
CN    106275664 A    1/2017
(Continued)

OTHER PUBLICATIONS

International Search Report and Written Opinion (with English translation) issued in PCT/CN2020/071501, dated Aug. 20, 2020, 13 pages.
(Continued)

*Primary Examiner* — Thomas M Wittenschlaeger
*Assistant Examiner* — Katie L Gerth
(74) *Attorney, Agent, or Firm* — HSML P.C.

(57) ABSTRACT

An inner membrane removing device includes a heating membrane removing mechanism and a membrane suction mechanism located at a downstream of the heating membrane removing mechanism. The heating membrane removing mechanism includes a heating frame, a membrane pressing component, a membrane welding component configured to fusion weld a nest box inner membrane to a nest box inner lining paper, a first lifting component configured to enable the heating frame and the membrane welding component to be in contact with the nest box inner membrane and a second lifting component configured to enable the membrane pressing component to press against the nest box inner membrane. The membrane pressing component and the mem-
(Continued)

brane welding component are located on an inside of the heating frame. An inner membrane removing method is also provided.

9 Claims, 4 Drawing Sheets

(58) Field of Classification Search
USPC .......................................................... 53/492
See application file for complete search history.

(56) References Cited

U.S. PATENT DOCUMENTS

| | | | | | |
|---|---|---|---|---|---|
| 6,503,130 | B2* | 1/2003 | Lim | ........................ | B24B 37/34 |
| | | | | | 156/716 |
| 7,021,033 | B2* | 4/2006 | Close | ...................... | B65B 43/40 |
| | | | | | 53/492 |
| 10,081,527 | B2* | 9/2018 | Gold | ......................... | B25J 21/00 |
| 11,111,048 | B2* | 9/2021 | Franke | ................. | B65B 69/0033 |
| 2004/0168408 | A1* | 9/2004 | Spatafora | .............. | B65B 43/305 |
| | | | | | 53/566 |
| 2005/0160704 | A1* | 7/2005 | Miksch | ................... | B65B 69/00 |
| | | | | | 53/492 |
| 2009/0208316 | A1* | 8/2009 | Mayer | .................... | B65B 69/00 |
| | | | | | 414/800 |

FOREIGN PATENT DOCUMENTS

| | | | | |
|---|---|---|---|---|
| CN | 207467131 U | | 6/2018 | |
| CN | 108860870 A | | 11/2018 | |
| CN | 109484727 A | * | 3/2019 | .............. A47J 36/06 |
| CN | 208665729 A | | 3/2019 | |
| CN | 209336081 U | | 9/2019 | |
| CN | 210966346 U | | 7/2020 | |
| DE | 10252572 A1 | * | 5/2004 | ......... B65B 69/0066 |
| JP | H1024418 A | | 1/1998 | |
| KR | 1020150015495 A | | 2/2015 | |
| WO | 2012048838 A1 | | 4/2012 | |

OTHER PUBLICATIONS

Office Action issued for Indian Patent Application No. 202247034161, Date of Dispatch Aug. 18, 2022, 6 pages.

Notice of Allowance issued for Korean Patent Application No. 10-2022-7019489, Mailing Date: Feb. 1, 2024, 3 pages including English translation.

Notification of Reasons for Refusal issued for Japanese Patent Application No. 2022-528045, Transmittal date: Apr. 25, 2023, 4 pages including English translation.

Extended European Search Report issued for European Patent Application No. 20887111.1, dated Jan. 2, 2024, 5 pages.

* cited by examiner

INNER MEMBRANE REMOVING DEVICE AND INNER MEMBRANE REMOVING METHOD THEREOF

CROSS-REFERENCE TO RELATED APPLICATIONS

The present disclosure is a national stage for International Application PCT/CN2020/071501, filed on Jan. 10, 2020, which claims priority benefit of Chinese Patent Application No. 201911119239X filed on Nov. 15, 2019, entitled "INNER MEMBRANE REMOVING DEVICE AND INNER MEMBRANE REMOVING METHOD THEREOF", the entire contents of both applications are incorporated herein for all purposes.

TECHNICAL FIELD

The present disclosure relates to packaging technology about food and drugs, in particular to an inner membrane removing device and an inner membrane removing method.

BACKGROUND

At present, there are two main methods to remove a nest inner membrane. One method is to tear the nest box inner membrane directly from a nest box by a clip. Because the nest box inner membrane is glued to an upper surface of the nest box, dust particles are easy to be generated in the tearing process, and there is a great risk of pollution of the medicine bottle in the nest box. The other method is to heat the nest box inner membrane, first heat the nest box inner membrane to enable the glue to be melt, and then remove the nest box inner membrane. This method greatly reduces the generation of dust particles and has higher recognition. In the method of heating the nest box inner membrane, a heating frame of an inner membrane removing device and a nest box inner membrane removing portion of the inner membrane removing device are formed in one, and the heating frame and the nest box inner membrane removal portion suck the nest box inner membrane by turning over. The inner membrane removing device has disadvantages as follows: 1, a nest box inner membrane removal driving portion is fixed on the heating frame, that is, a power source is located above the nest box, the power source causes a risk of pollution of the medicine bottle in the nest box; 2, when the heating frame is turned over, the nest box inner membrane is sucked to be removed at the same time, if dust particles are generated during the turning process, the dust particles may fall directly to a mouth of the medicine bottle, which also causes the risk of pollution of the medicine bottle; 3, nest box inner membrane heating, nest box inner membrane removal and lining paper are concentrated in one station, so it takes a long time, which affects a production efficiency; 4, the heating frame needs to be turned over and the heating frame is heavy, which results in complex structure, large volume and high energy consumption.

SUMMARY

Technical problems to be solved by the present disclosure is to overcome the deficiencies of the prior art, the present disclosure provides an inner membrane removing device with simple structure, a high efficiency and helping to reduce pollution.

The present disclosure further provides an inner membrane removing method employed in the inner membrane removing device.

In order to solve the above-mentioned technical problems, the present disclosure provides technical solutions as following.

An inner membrane removing device includes a heating membrane removing mechanism and a membrane suction mechanism located at a downstream of the heating membrane removing mechanism, the heating membrane removing mechanism includes a heating frame, a membrane pressing component, a membrane welding component configured to fusion weld a nest box inner membrane to a nest box inner lining paper of the nest box, a first lifting component configured to enable the heating frame and the membrane welding component to be in contact with the nest box inner membrane; and a second lifting component configured to enable the membrane pressing component to press against the nest box inner membrane; the membrane pressing component and the membrane welding component are located on an inside of the heating frame.

As a further improvement of the above technical program: the first lifting component is connected to the nest box, and the second lifting component is connected to the membrane pressing component.

As a further improvement of the above technical program: the heating frame, the membrane pressing component and the membrane welding component are located above a frame, and the first lifting component and the second lifting component are located below the frame.

As a further improvement of the above technical program: both ends of the first lifting component are provided with two first support rods, an upper end of the first support rod extends through the frame, and the upper end of the first support rod is provided with a support plate configured to support the nest box.

As a further improvement of the above technical program: both ends of the second lifting component are provided with two second support rod, the first support rod is of a hollow structure, both sides of the membrane pressing component are provided with two connecting lugs extending to an outside of the heating frame, and an upper end of the second support rod extends through the first support rod and is connected to the connecting lugs.

As a further improvement of the above technical program: the membrane suction mechanism comprises an upper suction cup, a lower suction cup, a rotating arm and a third lifting component, the upper suction cup is provided on the rotating arm, and the third lifting component is connected to the rotating arm.

As a further improvement of the above technical program: the membrane pressing component is a membrane pressing frame, and the membrane welding component is located in the membrane pressing frame.

An inner membrane removing method employed the above inner membrane removing device, includes:

S1, heating and fusion welding: enabling, by a first lifting component, a heating frame and a membrane welding component to be in contact with a nest box inner membrane, heating, by the heating frame, an edge area of the nest box inner membrane, fusion welding, by the membrane welding component, a middle area of the nest box inner membrane with the nest box inner lining paper, and then enabling, by the first lifting component, the nest box inner membrane to be separated from the heating frame and the membrane welding component;

S2, pressuring and removing inner membrane: enabling, by the second lifting component, a membrane component to press the nest box inner membrane, and separating the edge of the nest box inner membrane from a nest box; and S3, sucking nest box inner membrane and nest box inner lining paper: sucking, by a membrane suction mechanism, the nest box inner membrane and nest box inner lining paper that are fusion welded together.

As a further improvement of the above technical program: in step S1, the first lifting component drives the nest box to move upward to enable the heating frame and the membrane welding component to be in contact with the nest box inner membrane, then the first lifting component drives the nest box to move downward to separate the nest box inner membrane from the heating frame and the membrane welding component, wherein in step S2, the second lifting component drives the membrane pressing component to move downward to press the nest box inner membrane.

As a further improvement of the above technical program: in step S3, when an upper suction cup sucks the nest box inner membrane and nest box inner lining paper that are fusion welded together, a lower suction cup sucks and is fixed to the nest box.

Compared with the prior art, the present disclosure has the advantages that: the inner membrane removing device disclosed by the present disclosure divides the heating membrane removing mechanism and the membrane suction mechanism into an upstream station and a downstream station. Assembly line operation is adopted in both stations, which can improve work efficiency. After heating and removing membrane of the nest box in the upstream station, the nest box is cooled in a process of conveying to the downstream station, so that the nest box inner membrane is more firmly connected to the nest box inner lining paper, which is conducive to more reliably suck the nest box inner membrane and the nest box inner lining paper at the same time in the downstream station. The heating frame of the heating membrane removing mechanism is used to heat an edge of the nest box inner membrane to melt the glue, so as to facilitate a subsequent separation of the nest box inner membrane from the nest box. An inner side of the heating frame is provided with the membrane pressing component and the membrane welding component. The membrane pressing component presses the nest box inner membrane to a bottom of the nest box, so that the edge portion of the nest box inner membrane is separated from the nest box. At the same time, the nest box inner membrane wraps a medicine bottle in the nest box, greatly reducing a risk of pollution of the medicine bottle. When the heating frame heats the edge portion of the nest box inner membrane, the membrane welding component connects a middle area of the nest box inner membrane and the nest box inner lining paper by fusion welding, and the membrane suction mechanism sucks the nest box inner membrane and the nest box inner lining paper at the same time, so as to improve an efficiency of sucking the membrane and lining paper.

In the inner membrane removing method, the first lifting component enables the heating frame and the membrane welding component in contact with the nest box inner membrane, the heating frame heats an edge area of the nest box inner membrane, the membrane welding component connects the middle area of the nest box inner membrane with the nest box inner lining paper by fusion welding, and then the first lifting component enables the nest box inner membrane move away from the heating frame and the membrane welding component. The second lifting component enables the membrane pressing component located inside the heating frame press down the nest box inner membrane to the bottom of the nest box, so that the edge portion of the nest box inner membrane of the nest box is separated from the nest box. At the same time, the nest box inner membrane wraps the medicine bottle in the nest box, which greatly reduces the risk of pollution of the medicine bottle. The membrane suction mechanism sucks the nest box inner membrane and the nest box inner lining paper at the same time, which eliminating a step of sucking the lining paper and improving the efficiency. At the same time, the nest box inner membrane removing method only needs the first lifting component and the second lifting component to move up and down, so that the operation is simpler.

Numbers of components in the figures: 1, heating demolding mechanism; 11, heating frame; 12, membrane pressing component; 121, connecting lug; 13, membrane welding component; 14, first lifting component; 15, second lifting component; 16, support plate; 17, first support rod; 18, second support rod; 2, membrane suction mechanism; 21, upper suction cup; 22, lower suction cup; 23, rotating arm; 24, third lifting component; 3, nest box; 31, nest box inner membrane; 32, nest box lining paper; 4, frame; 5, conveying track.

DETAILED DESCRIPTION OF THE EMBODIMENTS

The present disclosure is further described in detail below with reference to the accompanying drawings and embodiments.

Figure 1:
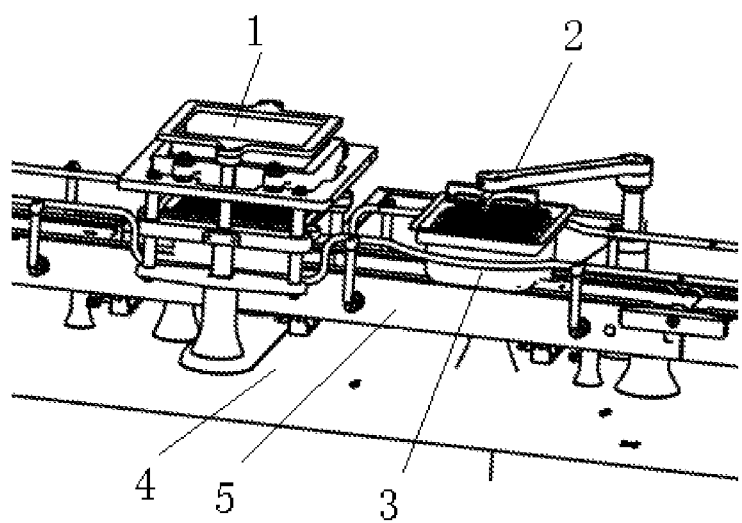
FIG. 1 is a perspective view of an inner membrane removing device of the present disclosure.
Figure 2:
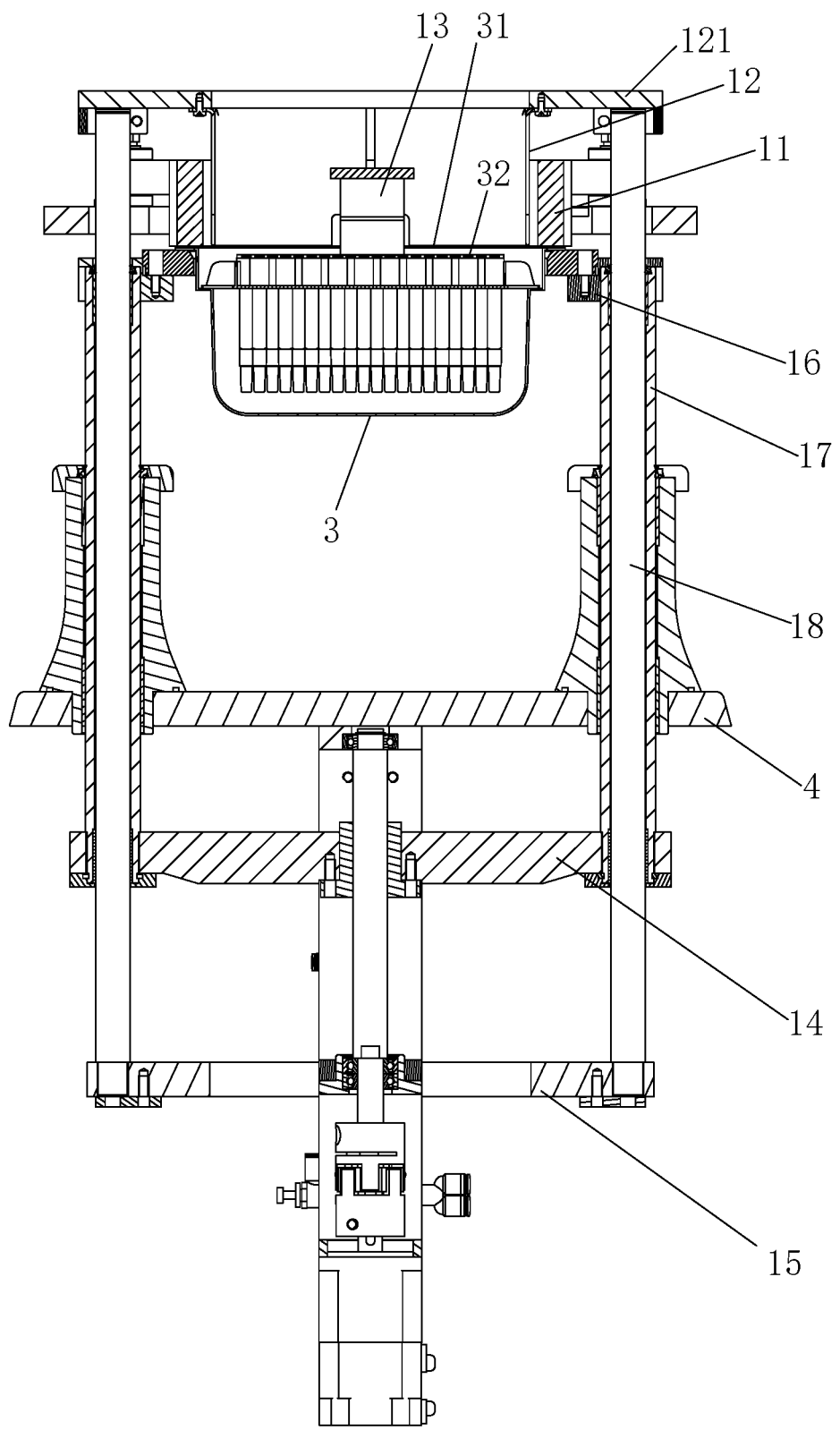
FIG. 2 is a schematic view of a membrane heating demolding mechanism of the present disclosure in a heating membrane state.
Figure 3:
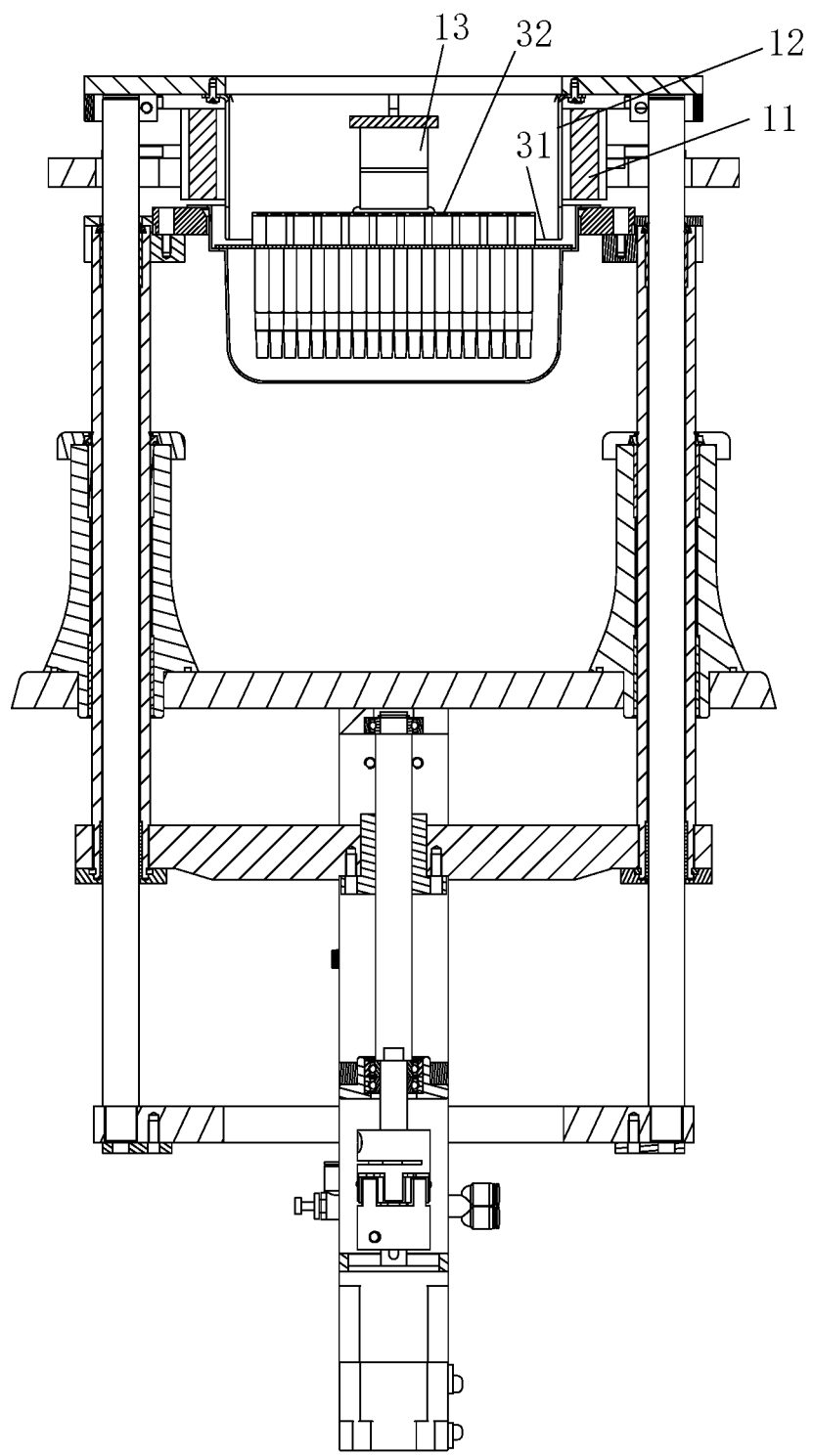
FIG. 3 is a schematic view of the membrane heating demolding mechanism of the present disclosure in a pressing membrane state.
Figure 4:
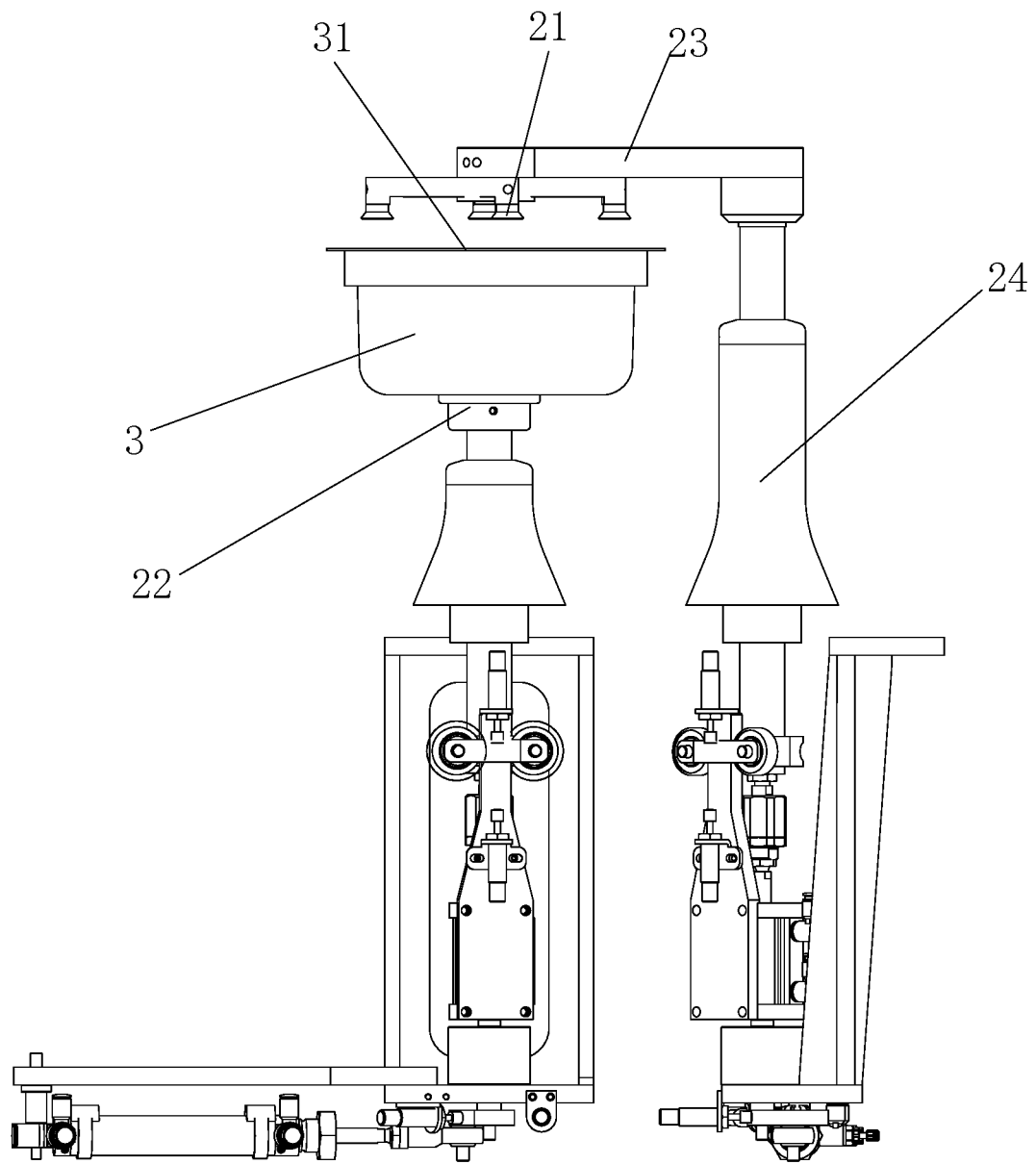
FIG. 4 is a schematic view of the membrane suction mechanism of the present disclosure.

FIGS. 1 to 4 show an embodiment of an inner membrane removing device of the present disclosure. The inner membrane removing device of the embodiment includes a heating membrane removing mechanism 1 and a membrane suction mechanism 2 located at a downstream of the heating membrane removing mechanism 1. The heating membrane removing mechanism 1 includes a heating frame 11, a membrane pressing component 12, a membrane welding component 13 configured to fusion weld a nest box inner membrane 31 to a nest box inner lining paper 32, a first lifting component 14 configured to enable the heating frame 11 and the membrane welding component 13 to be in contact with the nest box inner membrane 31, and a second lifting component 15 configured to enable the membrane pressing component 12 to press against the nest box inner membrane 31. The membrane pressing component 12 and the membrane welding component 13 are located on an inside of the heating frame 11. The first lifting component 14 and the second lifting component 15 can be lifted by, for example, air cylinders.

The inner membrane removing device divides the heating membrane removing mechanism 1 and the membrane suction mechanism 2 into an upstream station and a downstream station. Assembly line operation is adopted in both stations, which can improve work efficiency. After heating and removing membrane of a nest box 3 in the upstream station, the nest box 3 is cooled in a process of conveying to the downstream station, so that the nest box inner membrane 31 is more firmly connected to the nest box inner lining paper 32, which is conducive for the downstream station to more reliably suck the nest box inner membrane 31 and the nest box inner lining paper 32 at the same time. The heating membrane removing mechanism 1 includes the heating frame 11, which is used to heat an edge of the nest box inner membrane 31 to melt the glue, so as to facilitate a subsequent separation of the nest box inner membrane 31 from the nest box 3. An inner side of the heating frame 11 is provided with the membrane pressing component 12 and the membrane welding component 13. The membrane pressing component 12 presses the nest box inner membrane 31 downward to a bottom of the nest box 3, so that the edge portion of the nest box inner membrane 31 is separated from the nest box 3. At the same time, the nest box inner membrane 31 wraps a medicine bottle in the nest box 3, greatly reducing a risk of pollution of the medicine bottle. When the heating frame 11 heats the edge portion of the nest box inner membrane 31, the membrane welding component 13 connects a middle area of the nest box inner membrane 31 and the nest box inner lining paper 32 by fusion welding, and the membrane suction mechanism 2 sucks the nest box inner membrane 31 and the nest box inner lining paper 32 at the same time, so as to improve an efficiency of sucking the membrane and lining paper.

Further, in this embodiment, the first lifting component 14 is connected to the nest box 3, and the second lifting component 15 is connected to the membrane pressing component 12. The first lifting component 14 drives the nest box 3 with small weight to lift, and the second lifting component 15 drives the membrane pressing component 12 to lift, which simplifies a driving mechanism and reduces the cost. In other embodiments, the heating frame 11 and the membrane welding component 13 with heavy weight can also be driven up and down. A disadvantage is that the cost of the driving mechanism is increased.

Further, in this embodiment, the heating frame 11, the membrane pressing component 12 and the membrane welding component 13 are located above a frame 4, and the first lifting component 14 and the second lifting component 15 are located below the frame 4. By arranging the first lifting component 14 and the second lifting component 15 under the frame 4, a risk of pollution of the medicine bottle in the nest box 3 is avoided.

Further, in this embodiment, both ends of the first lifting component 14 are provided with two first support rods 17, an upper end of the first support rod 17 extends through the frame 4, and the upper end of the first support rod 17 is provided with a support plate 16 configured to support the nest box 3. Through the first support rods 17 at two ends of the first lifting component 14 and the support plates 16 on the support rods 17, the first lifting component 14 can reliably lift the nest box 3.

Further, in this embodiment, both ends of the second lifting component 15 are provided with two second support rods 18, the first support rod 17 is of a hollow structure, both sides of the membrane pressing component 12 are provided with two connecting lugs 121 extending to an outside of the heating frame 11, and an upper end of the second support rod 18 extends through the first support rod 17 and is connected to the connecting lug 121, which is simple and compact. The first support rod 17 can also provide guidance for the lifting of the second support rod 18 to ensure a smooth lifting process of the membrane pressing component 12.

Further, in this embodiment, the membrane suction mechanism 2 includes an upper suction cup 21, a lower suction cup 22, a rotating arm 23, and a third lifting component 24. The upper suction cup 21 is provided on the rotating arm 23, and the third lifting component 24 is connected to the rotating arm 23. After the nest box 3 is transported in position, the rotating arm 23 drives the upper suction cup 21 to rotate to above the nest box 3, and then the third lifting component 24 drives the rotating arm 23 to move downward. The upper suction cup 21 sucks the nest box inner membrane 31 and the lining paper 32 of the nest box. At the same time, the lower suction cup 22 adsorbs and fixes the nest box 3 to keep the nest box 3 in a stable state. Finally, the third lifting component 24 drives the rotating arm 23 to move upward, and the rotating arm 23 drives the upper suction cup 21 to rotate above a collection container, the upper suction cup 21 discards the nest box inner membrane 31 and the nest box inner lining paper 32 into the collection container.

As a preferred technical solution, in this embodiment, the membrane pressing component 12 is a membrane pressing frame, which can compress the nest box inner membrane 31 as a whole and wrap the medicine bottle in the nest box 3 in an all-round way. The membrane welding component 13 is located in the membrane pressing frame. In other embodiments, the membrane pressing component 12 can also compress several areas of the nest box inner membrane 31, such that the edge of the nest box inner membrane 31 is separated from the nest box 3.

An inner membrane removing method of the present disclosure in this embodiment include steps:

S1, heating and fusion welding: the first lifting component 14 enables the heating frame 11 and the membrane welding component 13 to be in contact with the nest box inner membrane 31, the heating frame 11 heats an edge area of the nest box inner membrane 31, the membrane welding component 13 fusion welds the middle area of the nest box inner membrane 31 with the nest box inner lining paper 32, and then the first lifting component 14 enables the nest box inner membrane 31 to be separated from the heating frame 11 and the membrane welding component 13. In an embodiment, the first lifting component 14 can drive the nest box 3 to move up and down, to be in contact with and separated from the heating frame 11 and the membrane welding component 13. In another embodiment, the first lifting component 14 can also drive the heating frame 11 and the membrane welding component 13 to move up and down.

S2, pressuring and removing inner membrane: the second lifting component 15 enables the membrane pressing component 12 to press the nest box inner membrane 31, and the edge of the nest box inner membrane 31 is separated from the nest box 3. In an embodiment, the second lifting component 15 can drive the nest box 3 to move upward and press the membrane pressing component 12. In another embodiment, the second lifting component 15 can also drive the membrane pressing component 12 to move downward and press the nest box inner membrane 31;

S3, sucking nest box inner membrane and nest box inner lining paper: the membrane suction mechanism 2 sucks the nest box inner membrane 31 and nest box inner lining paper 32 that are fusion welded together.

In the nest box inner membrane removing method, the membrane pressing component 12 presses the nest box inner membrane 31 to the bottom of the nest box 3, so that the edge portion of the nest box inner membrane 21 of the nest box is separated from the nest box 3. At the same time, the nest box inner membrane 31 wraps the medicine bottle in the nest box 3, which greatly reduces the risk of pollution of the medicine bottle. The membrane suction mechanism 2 sucks the nest box inner membrane 31 and the nest box inner lining paper 32 at the same time, which eliminating a step of sucking the lining paper and improving the efficiency. At the same time, the nest box inner membrane removing method only needs the first lifting component 14 and the second lifting component 15 to move up and down, so that the operation is simpler.

As the preferred technical solution, in step S1, the first lifting component 14 drives the nest box 3 to move upward, so as to enable the heating frame 11 and the membrane welding component 13 to be in contact with the nest box inner membrane 31, then the first lifting component 14 drives the nest box 3 to move downward to separate the nest box inner membrane 31 from the heating frame 11 and the membrane welding component 13. In step S2, the second lifting component 15 drives the membrane pressing component 12 to move downward to press the nest box inner membrane 31, which simplifies the driving mechanism and reduces the cost.

As the preferred technical solution, in step S3, when the upper suction cup 21 sucks the nest box inner membrane 31 and nest box inner lining paper 32 that are fusion welded together, the lower suction cup 22 sucks and is fixed to the nest box 3, so as to ensure that the nest box 3 remains stable during the process of sucking the membrane.

The foregoing descriptions are merely specific embodiments of the present invention, but are not intended to limit the protection scope of the present invention. Any variation or replacement readily figured out by a person skilled in the art within the technical scope disclosed in the present invention shall all fall within the protection scope of the present invention. Therefore, the protection scope of the present invention shall be subject to the protection scope of the appended claims.

What is claimed is:

1. An inner membrane removing device, comprising: a heating membrane removing mechanism and a membrane suction mechanism located at a downstream of the heating membrane removing mechanism, wherein the heating membrane removing mechanism comprises a heating frame, a membrane pressing component, a membrane welding component configured to fusion weld a nest box inner membrane to a nest box inner lining paper, a first lifting component configured to enable the heating frame and the membrane welding component to be in contact with the nest box inner membrane; and a second lifting component configured to enable the membrane pressing component to press against the nest box inner membrane, wherein the membrane pressing component and the membrane welding component are located on an inside of the heating frame, wherein the first lifting component is connected to a nest box, and the second lifting component is connected to the membrane pressing component.

2. The inner membrane removing device according to claim 1, wherein the heating frame, the membrane pressing component, and the membrane welding component are located above a frame, and the first lifting component and the second lifting component are located below the frame.

3. The inner membrane removing device according to claim 2, wherein both ends of the first lifting component are provided with two first support rods, an upper end of the first support rod extends through the frame, and the upper end of the first support rod is provided with a support plate configured to support the nest box.

4. The inner membrane removing device according to claim 3, wherein both ends of the second lifting component are provided with two second support rod, the first support rod is of a hollow structure, both sides of the membrane pressing component are provided with two connecting lugs extending to an outside of the heating frame, and an upper end of the second support rod extends through the first support rod and is connected to the connecting lugs.

5. The inner membrane removing device according to claim 1, wherein the membrane suction mechanism comprises an upper suction cup, a lower suction cup, a rotating arm, and a third lifting component, the upper suction cup is provided on the rotating arm, and the third lifting component is connected to the rotating arm.

6. The inner membrane removing device according to claim 1, wherein the membrane pressing component is a membrane pressing frame, and the membrane welding component is located in the membrane pressing frame.

7. An inner membrane removing method comprising:
S1, enabling, by a first lifting component, a heating frame and a membrane welding component to be in contact with a nest box inner membrane, heating, by the heating frame, an edge area of the nest box inner membrane, fusion welding, by the membrane welding component, a middle area of the nest box inner membrane with the nest box inner lining paper, and then enabling, by the first lifting component, the nest box inner membrane to be separated from the heating frame and the membrane welding component;
S2, enabling, by the second lifting component, a membrane component to press the nest box inner membrane, and separating the edge of the nest box inner membrane from a nest box; and
S3, sucking, by a membrane suction mechanism, the nest box inner membrane and nest box inner lining paper that are fusion welded together.

8. The nest box inner membrane removing method according to claim 7, wherein in step S1, the first lifting component drives the nest box to move upward to enable the heating frame and the membrane welding component to be in contact with the nest box inner membrane, then the first lifting component drives the nest box to move downward to separate the nest box inner membrane from the heating frame and the membrane welding component, wherein in step S2, the second lifting component drives the membrane pressing component to move downward to press the nest box inner membrane.

9. The nest box inner membrane removing method according to claim 7, wherein in step S3, when an upper suction cup sucks the nest box inner membrane and nest box inner lining paper that are fusion welded together, a lower suction cup sucks and is fixed to the nest box.

* * * * *